United States Patent Office 3,483,106
Patented Dec. 9, 1969

3,483,106
RADIATION POLYMERIZATION OF TRIOXANE IN THE PRESENCE OF POLAR IMPURITIES
Henri Sack, deceased, late of Le Raincy, France, by Berthe Sack, nee Afnain, sole heir, Verneuil-en-Halatte, France, assignor to Houilleres du Bassin du Nord & du Pas de Calais, Douai, Nord, France
No Drawing. Continuation-in-part of application Ser. No. 167,765, Jan. 22, 1962. This application July 26, 1966, Ser. No. 568,054
Claims priority, application France, Jan. 24, 1961, 850,550
Int. Cl. C08f 1/16; B01j 1/10
U.S. Cl. 204—159.21
7 Claims

ABSTRACT OF THE DISCLOSURE

Process for the preparation of high molecular weight polyoxymethylene wherein polar impurities are admixed with trioxane, and then subjecting said mixture to high energy ionizing radiation followed by heating to cause same to be polymerized.

---

This is a continuation-in-part of my copending application for United States Patent Ser. No. 167,765, filed Jan. 22, 1962, which describes the Preparation of Polyformaldehydes.

The polymerization of trioxane in the solid phase by radiation (X-rays, gamma rays of cobalt 60 or of caesium 137, accelerated electrons) used as activating agents of the monomer is known.

That reaction, compared to the polymerization conducted by irradiation of monomeric formaldehyde has from a scientific as well as from an industrial point of view a certain number of distinctive characteristics. From the scientific point of view, the techniques called upon to play a part are different, since, on the one hand, the polymerization reaction causes the opening of a double bond and that, on the other hand, the reaction takes place by splitting of a cyclic single bond. From an industrial point of view the polymerization of trioxane, which does not liberate any heat, is easier to control, all the more so since trioxane is more stable than formaldehyde, is easier to purify, and also because the polymerization reaction in the solid phase can be effected at a temperature close to the temperature of the environment, the melting point of trioxane being around 60° C.

But, on the other hand, the reaction of polymerization of trioxane in the solid phase has two important disadvantages which have hitherto prevented its industrial use:

The first disadvantages is the difficulty there is in preparing polymers having a predetermined molecular weight, this being caused by the very conditions of polymerization in itself when it is conducted in the solid phase which results in the heterogeneity thereby locally created.

The other disadvantages is the difficulty to stabilize the polyoxymethylenes prepared by that method.

As all polyoxymethylenes, the polymers obtained by radiochemical initiation and polymerization in the solid phase must undergo a subsequent stabilization treatment. In current practice, the known methods of stabilization, for instance, the acetylation such as described in French Patent 1,131,939 result, when applied to the products obtained by radiochemical processes, and due to the fact that polymers are fibrous and highly crystalline, in a partial stabilization which is markedly insufficient for meeting industrial needs.

To remedy these disadvantages, we have now developed a process for the preparation of ε-polyoxymethylene by which can be obtained, due to the irradiation of trioxane under controlled conditions, a raw product of very high molecular weight capable of undergoing a subsequent transformation during which the polyoxymethylene molecular weight can be checked and the product simultaneously stabilized.

The object of the invention is to provide a radiochemical process for manufaturing polymers having a reduced viscosity ranging between 3.5 and 5, a sulphite index between 0 and 2 and capable of thereafter being subjected to the necessary reactions to convert same into products which can be used in industry.

The reduced viscosity "$\eta_{red}$" of a polyoxymethylene according to the invention is defined as being equal to:

$$\eta_{red} = \frac{\dfrac{\text{viscosity of the solution}}{\text{viscosity of the solvent}} - 1}{\text{concentration in g./dl. of the polymer product in the solution}}$$

This viscosity is measured at 150° C. in aniline containing 1% of diphenylamine (these polyoxymethylenes being insoluble, within the range of temperatures used for measuring viscosity, in solvents such as the p-chlorophenol, gamma-butyrolacetone or the dimethylformamide).

The polyoxymethylenes obtained by the present invention become, after being treated, soluble in dimethylformamide at a temperature of 150° C. The molecular weight of the polymeric products so treated has been considered by measuring, at 150° C., the viscosity of a dimethylformamide solution containing 0.25% of polymer.

The sulphite index of a polyoxymethylene characterizes the depolymerization speed of the polyoxymethylene in a normal solution of sodium sulphite. It is determined by the following method: 2 gr. of crushed polyoxymethylene are agitated during 5 minutes with 50 cc. of 1 N sodium sulphite. It is then caused to react during 8 hours at ambient temperature. After this time the mixture is titrated with a 1 N solution of sulfuric acid in the presence of thymolphthalein as indicator. Assuming the consumption of sulfuric acid to be $n$ cc.

The sulphite index is equal to $=\dfrac{n \times 30 \times 100}{2 \times 1000}$

The whole process comprises the following steps, some of which are individually characteristic of the invention:

(1) Activation in the solid phase, and at a temperature which is in the range: 10° C.–1° C. below its melting point, of a trioxane containing less than 1500 mg./kg. of polar substances, by means of controlled ionizing irradiation in a dose of less than 10,000 rads per 1% of conversion.

(2) Polymerization of the impure trioxane thus activated at a temperature above or equal to the activation temperature but still in the solid phase, i.e., below melting point.

(3) Shortening of the polymer chain length to a value corresponding to a viscosity of from 0.5 to 1.5 measured in 0.25% solution of dimethylformamide.

(4) In step 3, stabilization of the resultant chains by blocking at least some of their ends can be obtained simultaneously.

It will be apparent from this definition of the whole process that a first main feature of the invention concerns the activating and the polymerizing steps, which are particularly characterized by the nature, i.e., the purity, of the trioxane treated, by the treatment temperature and by the irradiation dose.

With regard to the purity of the trioxane, the invention is concerned more particularly with the use of industrial trioxane as commercially available at present or of pure trioxane containing traces of water, formic acid and of methanol, such as result from Tischenko's reaction on formaldehyde. Trioxane of this kind which contains the normal impurities arising out of the manufacture of industrial trioxane will hereinafter be referred to as industrial available trioxane as opposed to "pure trioxane", and its melting point (in the capillary) is about 61° C.

The temperature and the radiation dose are also important factors in achieving a good yield and desirable molecular weights, and so each of the main conditions of these two steps will have to be described separately.

In short, such conditions are the following:

Condition 1: Maximum permissible radiation dose.
Condition 2: Narrow temperature ranges for polymerization.
Condition 3: Polymerization in an atmosphere with very low and controlled oxygen content.
Condition 4: Restrictions of water content and of other polar substances in the medium irradiated.

The condition 1 is relative more particularly to the purpose of the invention, while the other conditions have an effect more particularly directed to increase the aptitude of polymers with regard to modification and stabilization of the chains. Of course, however, all the conditions complement one another and must be considered individually as well as in their different combinations.

Each of these individual conditions will now be considered in greater detail.

CONDITION 1

To avoid the formation of polyformaldehyde within the source and to avoid the formation of polyformaldehyde of low molecular weight due to premature combination of the polymeric chains, the process must be carried out using the lowest possible radiation doses. More precisely, the radiation dose should be less than 10,000 rads per 1% conversion. These doses result from an absorbed dose rate of the order of 2000 rads/hour, such as are emitted by a cobalt 60 source, and the engineer in the art can modify the irradiation conditions as required in accordance with the intensity and energy of the radiation.

CONDITION 2

A first means was careful selection of the irradiation and polymerization temperatures, for it was found that there is a temperature range in which the rate of polymerization is the greatest. This range extends for the heating of the irradiated trioxane, from 40° C. to a temperature of about 1° C. below the melting point of the trioxane used (it being understood, of course, as already stated, that the term "trioxane" always denotes a trioxane suitable for such polymerization).

CONDITION 3

It is advisable, not only for improving yield and molecular weight, but also to assist stabilization of the chains, to evacuate the polymerization vessel containing the mixture, preferably so that the residual partial oxygen pressure is below 10 mm. of mercury. An extra means providing strict control of the effects of oxygen is to combine the physical evacuation with the action of products which combine readily with oxygen, such as diphenols having a pH above 6 or aromatic amines, for instance, diphenylamine. Although the quantity of substances required for this effect varies, amounts of from about 1–5 parts per thousand are satisfactory in most cases.

CONDITION 4

To assist the readiness of the chains to become stable, the total water content of the impure trioxane used in the process, and the content of other polar substances, such as methanol and ethanol, must be checked very carefully; the maximum permissible quantity of such products must be kept less than 1500 mg./kg. (substances added as antioxidants do not count in the list given above).

The preferred process consists essentially in utilizing exclusively a trioxane in the solid phase of which the total contents of polar substances normally found in industrial trioxane (formic acid, free formaldehyde, water, methanol, methylal, methyl formate) is either under or equal to 150 mg./kg., and conditioned in such a manner that these substances are homogeneously distributed in the mass; in subjecting this trioxane to a radiation dose under 10,000 rads per 1% of conversion and preferably between 50,000 and 200,000 rads (X-rays, gamma rays, accelerated electrons); permitting the irradiated trioxane to settle during a length of time between 24 and 48 hours at ambient temperature for instance 25° C.; in polymerizing the irradiated trioxane by subjecting it to a temperature ranging between 51° and 55° C., preferably 53° C., during a length of time ranging between 24 and 72 hours, preferably 48 hours, and in an inert gas atmosphere such as nitrogen, carbon dioxide, helium, etc., or in the presence of hydrogen.

Now that a description has been given of the optimum conditions for carrying the first two stages of the process into effect, a more detailed description will be given of the processes whereby the products formed by polymerization can be best adapted to the industrial uses for which they are required.

Such products as are obtained at the end of the second stage are in the form of fibers and are little (if at all), suited for extrusion or molding and must therefore be modified by a process which can be selectively controlled to ensure optimum properties for industrial use of such products. One possible process is to effect shortening of the polymeric chains by a chemical treatment, for instance, by a chemical, or a mechanical treatment, such as mastication. In the former case, the ends of the existing chains can be blocked, for instance, by acetyl groups. In the second case, of course, chemical treatment, for instance, acetylation, could follow the mechanical treatment. Alternatively in another method of working, the two stages of modifying the chains and of stabilizing them can be performed simultaneously or in reverse order.

The following examples, some which are given for purpose of comparison, will more fully illustrate the invention.

Example 1

Trioxane is prepared by synthesis under very carefully controlled conditions and is thoroughly purified by the following steps; distillation in the form of its azeotrope with water, the formaldehyde which is distilled off being removed by means of ammonia; recrystallisation in aqueous solution; separation from the water by the addition of an equal quantity by weight of potassium pastilles, and decantation of the aqueous potassium-concentrated solution; drying of the organic layer over sodium, and fractionation over liquid potassium. The product distils at between 114.5 and 115° C., melts at 61–62° C. (capillary melting point) and is kept in sealed ampoules, with exclusion of light.

A 30 g. specimen of this trioxane is irradiated in its ampoule by a cobalt 60 source at an absorbed dose-rate of 2500 rads/hr. The experiment lasts for 400 hours at a temperature of 48° C. At the end of this time no trace of polymer could be detected. The yield is therefore zero. The same test was carried out again at 28° C. and only a very low quantity of polymer was obtained.

Example 2

To a trioxane particularly pure and of which the polymerization is zero or extremely low, as explained in Example 1, various compounds of the types found in industrial trioxane, namely: methanol, formic acid and water were added.

Each sample has been irradiated in the open air with a dose of 100,000 rads, by X-rays generated at 150 kv. and 12 ma. After irradiation the samples were cut in pieces of 4 cm. x 7 cm. (the thickness being 1 cm.) and allowed to settle during 24 hours and polymerized in glass tubes at a temperature of 53° C., under nitrogen atmosphere, during 48 hours.

The observed results such as: percent of conversion, viscosity and sulphite index are indicated in the following table:

TABLE 1

| Substances added, mg./kg. | Conversion, percent | Reduced viscosity (in aniline) | Sulphite index |
|---|---|---|---|
| A, Methanol: | | | |
| 100 | 50.4 | 3 | 1.4 |
| 500 | 50.7 | 3.6 | 0.6 |
| 1,000 | 49 | 1.97 | 3.2 |
| B, Formic acid: | | | |
| 100 | 52 | 3.74 | 2 |
| 500 | 54 | 3.3 | 3.8 |
| 1,000 | 55 | 0.97 | 20 |
| C, Water: | | | |
| 100 | 53 | 3.6 | 2 |
| 500 | 45 | 1.65 | 13 |
| 1,000 | 10 | 1.67 | 13.6 |

These results show that while it is necessary, for getting a good yield of polymerization, to use trioxane containing certain polar substances, the amount thereof must be strictly controlled for obtaining a polyoxymethylene having the desired properties.

Example 3

Without irradiation, the trioxane cannot be polymerized. But for obtaining polyoxymethylenes conformable to the invention, it is necessary to very precisely control the irradiation dose received by the trioxane and the time of polymerization. This is illustrated by the following tests in which a purified trioxane (containing about 100 p.p.m. of "activated" impurities, namely: methanol, formic acid, water, free formaldehyde, methyl formate) is subjected to irradiation in open air, then polymerized at 50° C., under nitrogen atmosphere, during variable lengths of time.

The polyoxymethylenes thus obtained have the viscosities and sulphite indices listed in Tables 2 and 3.

TABLE 2

| | Viscosity in aniline of the polymer after a polymerization of— | | | |
|---|---|---|---|---|
| | 8 hours | 24 hours | 48 hours | 72 hours |
| Irradiation dose in rads: | | | | |
| 24,000 | 2.3 | 2.6 | 2.6 | 2.7 |
| 48,000 | 2.8 | 2.9 | 3.5 | 3.3 |
| 100,000 | 3.5 | 3.6 | 3.9 | 3.6 |
| 500,000 | 3.3 | 3.5 | 3.5 | 3 |
| 1,000,000 | 2.6 | 2.7 | 2.6 | 2.5 |
| 5,000,000 | 0.9 | 0.8 | 0.9 | 0.9 |

TABLE 3

| | Sulphite index after a polymerization of | | | |
|---|---|---|---|---|
| | 8 hours | 24 hours | 48 hours | 72 hours |
| Irradiation dose in rads: | | | | |
| 24,000 | 6.6 | 4.7 | 3.6 | 3.5 |
| 48,000 | 4.5 | 4.6 | 2.5 | 2.2 |
| 100,000 | 2.9 | 2 | 1.5 | 1.3 |
| 500,000 | 0.9 | 0.4 | 0.6 | 1 |
| 1,000,000 | 1.3 | 0.9 | 1.2 | 1 |
| 5,000,000 | 10.7 | 12 | 11 | 11 |

The results of these tests indicate that in order to obtain polyoxymethylenes fulfilling the purpose of the invention it is necessary to control both the irradiation dose received by the trioxane and the polymerization time of that monomer.

Example 4

5 kg. of trioxane, which, after purification, analyzes as follows:

| | P.p.m. |
|---|---|
| Water | 200 |
| Formic acid | 300 |
| Free formaldehyde | 300 |
| Ash | 7 |

(positive peroxide reaction to leuco derivatives of methylene blue) are melted at 20° C. above the melting point (59.5° C.), and 0.5% of diphenylamine (antioxidant) is added to the mixture; the mixture is then filtered through a fritted funnel which has previously been heated to remove a small quantity of thermopolymers (about 0.7%). The trioxane is poured into large aluminum dishes previously heated to 70° C. so that the layer of liquid is 1 to 2 cm. in depth. The mixture is allowed to cool slowly in order to form plates of trioxane which have a glassy appearance.

After cooling, the trioxane is introduced into an autoclave of 10 liters capacity. The autoclave is then evacuated by means of a vacuum pump for 5 minutes (vacuum of 0.1 mm. mercury), after which the autoclave is filled with nitrogen and the same working cycle is repeated twice. At the end of the last cycle a positive pressure of 200 g./cm.$^2$ of nitrogen is added in the autoclave. The same is then irradiated at a temperature of 18° C. by a cobalt 60 source at an absorbed doserate of 6000 rads/hr. for 7 hours. Polymerization is then effected at 53° C. for 48 hours. The mixture of trioxane and polyformaldehyde is crushed coarsely and the whole is introduced into a steam distillation apparatus in which are present 5 liters of boiling water containing 2 g. of sodium carbonate per liter. Steam is supplied to the vessel at a rate of about 2 kg./h., and the steam leaves the apparatus to enter the center of a 40-plate column. The water-trioxane azeotrope is collected at the top of the column and an aqueous solution containing a small amount of formaldehyde is collected at the bottom of the column. The treatment time is about 10 hours.

The polymer is then drained, centrifuged and dried in an air-circulating oven at a temperature of 70° C. for 48 hours. The yield is 48%, the melting point is 188° C. and $\eta_{red}$=3.6. Stability is excellent and, by and large, adequate for all uses not requiring an extended melting treatment. The thermal decomposition rate of this polymer at 160° C. is of the order of 1%/h. for the first three hours, and thereafter about 0.2%/h.

The value of this decomposition rate was determined by studying the amount of polymer volatilized in 10 minutes at 222° C. or in 10 hours at 160° C., these values being divided by 10; the coefficients thus obtained will hereinafter be referred to as $K_{222}$ and $K_{160}$. The solubility of the polymer in dimethylformamide is zero at 150° C.

The polymer is divided into six parts for different uses.

(a) The first part is carded to the apparent density of felt, of the order of 0.05, and it is found that the insulating property of such a mat is excellent. Contrary to the case with most organic thermal insulating substances, this insulating material can be used at temperatures above 100° C.

(b) The polymer is lightly carded to remove overdense parts (prickly type) and a felt is formed which is passed continuously between two rollers heated to a temperature of 190° C. The pressure applied to the mat is of the order of 500 kg./cm.$^2$. The speed depends upon the thickness of the mat but is so controlled that a smooth layer of a thickness of about 0.05 mm. is formed on each surface. The sheets thus prepared have a lustrous white appearance, are water-repellant, washable and paintable, and have excellent heat-insulating and sound-insulating properties. They can be used with advantage in the building industry.

(c) One part of polymer and two parts of a phenol-formaldehyde resin and 0.05 part of a 10% aqueous soda solution are introduced into a mixing apparatus such as a Werner mixer. The mixture is homogenized at 30° C. for 15 minutes, then subjected to a pressure of 15 kg./cm.$^2$ at a temperature of 110° C. for 20 minutes. The result is an agglomerated sheet which has great mechanical strength and excellent heat-insulating properties.

(d) One part of the polyoxymethylene hereinbefore described, and two parts of a copolymer (melting point of 160° C.) of trioxane and ethylene oxide containing interposed C—C groups, are introduced into the same apparatus and the mixture is homogenized by being mixed at a temperature of 168° C. for 15 minutes. This leads to a very useful polyformaldehyde composition which has the excellent mechanical properties of orientated polyoxymethylene and the workability of low-melting-point polyoxymethylene copolymers. Similarly, the polymer just described can be used as a functional reinforcing agent for other polymers provided that the second ingredient is not of an excessively acid nature.

(e) 12 g. of this polyoxymethylene are introduced into a 250 cc. capacity stainless steel autoclave. 39 g. of acetic anhydride, consisting of 99.75% of acetic anhydride and 0.25% of acetic acid, and 10 p.p.m. of sodium acetate are added and the air in the autoclave is removed and replaced by nitrogen. The autoclave is fitted to a vibration device, then heated uniformly for 20 minutes until its temperature is 185° C. This temperature is maintained for 130 minutes, then the autoclave is cooled to 20° C. in 15 minutes, the agitation continuing. After the autoclave has been opened, the product, which is in the form of a white powdery material, is washed with acetone to remove the acetic anhydride and acetic acid, then placed in a vacuum oven at 60° C. for 2 hours.

Weight of the stabilized polyoxymethylene powder: 11.85 g.

Melting point: 175–176° C.

0.3% of di(1-hydroxy-2-methyl-4-isobutyl-phenyl)-methane (a compound having antioxidant properties), 0.3% of malonamide and 0.1% of barium stearate are mixed into this product. This mixture is an excellent moulding material, since it is grade 2 (grade measurement to the ASTM standard: D1238–57T at a temperature of 195° C.: orifice diameter 2 mm., weight 3,160 kg.). The reduced viscosity in dimethylformamide at 150° C. is 0.9 (0.25% concentration). The thermal stability at 222° C. is 1% loss in weight in 30 minutes from a 0.2 g. specimen.

The material can be moulded in a press at a temperature of 210° C. to yield colorless and translucent specimens which have a tensile strength of 7.01 kg./mm.$^2$ and an elongation of 30%.

Example 5

0.39 g. of tert.-butyl-hydroperoxide is introduced into 1 kg. industrial trioxane having a melting point of 59.5° C., the mixture is cooled, then evacuated to a partial pressure of 10 mm. mercury and the trioxane is treated at ambient temperature with radiation from a cobalt 60 source at a distance such that the absorbed dose-rate equals 50,000 rads/hr. for 150 minutes. The mixture is then heated in a water bath at 50° C. for 63 hours. A 54% yield is obtained of a polymer which has a melting point of 185° C., $\eta^x = 3.7$ and which has high stability ($K_{160} = 3\%/h.$), the stability improving after stabilization to $K_{160} = 0.2\%/h.$ the product provides an excellent "polymer composition" having a $K_{222}$ of less than 0.2%/min.

Example 6

One example will now be given in which activation by irradiation, mechanical activation by crushing and compression, polymerization as hereinbefore described, and modification and stabilization of the chains by a chemical etherification treatment have been combined. The industrial product prepared in accordance with this example has outstanding properties. Industrial trioxane which has a melting point of 59.7° C. and which analyses as follows: aqueous OH 100 p.p.m., alcoholic OH 150 p.p.m., formic acid 50 p.p.m., free formaldehyde 100 p.p.m., nitrogen 50 p.p.m., ash 10 p.p.m., is crushed to a mean particle size of about 0.2 mm.

100 g. of this powder are compressed at ambient temperature in a cylindrical mould at a pressure of 700 kg./cm.$^2$ for 3 minutes. The cylinder thus formed is irradiated with a dose of 50,000 rads by gamma radiation of an absorbed dose-rate of 6,000 rads/hr. a temperature of 28° C. in the presence of air. After irradiation the cylinder is introduced into a metal vessel from which oxygen is removed by an aspirator for 10 minutes, whereafter nitrogen is introduced into the vessel, this operation being repeated three times. Polymerization is carried out at 52° C. for 48 hours. The cylinder is then crushed and washed with boiling xylene containing 1% of diphenylamine. 52% of polymer grains are obtained which flow freely and which have a form particularly suitable for further processing. The melting point is 191° C. and $\eta^x = 3.5$. The thermal stability of this powder is excellent, $K_{160}$ being of the order of 0.4%/h.

Example 7

Through irradiation in the solid phase, five polyoxymethylene samples were prepared, the characteristics of which are as follows:

| Polyoxymethylenes: | Reduced viscosity (in aniline) | Sulphite index |
|---|---|---|
| A | 4 | 1.5 |
| B | 3.5 | 1.3 |
| C | 2 | 2 |
| D | 3.5 | 5 |
| E | 3.5 | 7 |

12 g. of each of the polyoxymethylenses are introduced into a 250 cc. capacity stainless steel autoclave. 39 g. of acetic anhydride, consisting of 99.75% of acetic anhydride and 0.25% of acetic acid, and 10 p.p.m. of sodium acetate are added and the air in the autoclave is exhausted and replaced by nitrogen. The autoclave is fitted to a vibration device, then heated uniformly for 20 minutes until its temperature is 185° C. This temperature is maintained for 130 minutes, then the autoclave is cooled to 20° C. in 15 minutes, the agitation continuing. After the autoclave have been opened, the product, which is in the form of a white powdery material, is washed with acetone to remove the acetic anhydride and acetic acid, then placed in a vacuum oven at 60° for 2 hours.

Table 4 shows the results of these tests; there are indicated the viscosity of the product obtained, the yield of the operation which is represented by the weight of the polymer obtained compared to the weight of the initial polymer and the quantity of acetic anhydride used in the course of the treatment (quantity compared to the polymer treated).

TABLE 4

| Polyoxymethylenes: | Viscosity (solution at 25% in dimethylformamide) | Yield, percent | Percent used anhydride |
|---|---|---|---|
| A | 0.9 | 99.5 | 2 |
| B | 0.8 | 99.9 | 2 |
| C | 0.4 | 99 | 3 |
| D | 0.7 | 95 | 10 |
| E | 0.7 | 91 | 20 |

The figures of the above table show that:

When the reduced viscosity of the starting polymer is under 3.5, the stabilization operation described above leads to a very degraded product, having a molecular weight too low to be used in industry for the usual molding processing;

When the sulphite index of the starting polymer is beyond 2, the stabilization results in quite insufficient yields (under 95%) and the quantity of acetic anhydride used rises very rapidly.

Besides, all the polyoxymethylenes subjected to the method of stabilization described above have lost, once they have been processed, their fibrous nature and are suitable for the manufacture of molded articles; in contrast, if these polymers are treated in accordance with the known stabilization methods, such as those described, for instance in the French Patent 1,131,939, the product obtained keeps its fibrous nature which is not appropriate for manufacturing moulded articles due to an insufficient stability as demonstrated by the following Example 8.

Example 8

This example is intended to demonstrate that the $\epsilon$-polyoxymethylenes obtained by radiochemical methods which do not conform with the invention, cannot be stabilized by the method disclosed and protected by the French Patent 1,131,939.

An $\epsilon$-polyoxymethylene of a fibrous and crystalline appearance, obtained by a radiochemical process, having a reduced viscosity of 1.5 and a sulphite index of 13.2 is subjected to the treatment described in Example 1 in French Patent 1,131,939.

The appearance of the product obtained remains fibrous. The speed of thermal decomposition in nitrogen of this stabilized product is $K_{222}$ 0.5%/minute. This product is not suitable for manufacturing molded articles.

We claim:

1. A process for the preparation of high molecular weight polyoxymethylene capable of being acetylated, said process comprising subjecting trioxane containing 10–200 mg./kg. of water, 10–500 mg./kg. of methanol and 10–300 mg./kg. of formic acid at a temperature between 10° C. and a temperature approaching, but lower than the melting point of trioxane to ionizing radiation of a dose of less than $10^4$ rads/1% of polymerization and heating the thusly irradiated trioxane to less than the melting point of trioxane to cause same to be polymerized.

2. A process as claimed in claim 1 wherein the trioxane contains 10–1000 mg./kg. of a peroxide or hydroperoxide.

3. A process as claimed in claim 2 wherein the peroxide or hydroperoxide is tert-butyl hydroperoxide.

4. A process as claimed in claim 1 wherein the trioxane contains 10–1000 mg./kg. of a peroxide or hydroperoxide.

5. A process as claimed in claim 4 wherein the peroxide or hydroperoxide is tert-butyl hydroperoxide.

6. A process as claimed in claim 1 further comprising acetylating the polymerized trioxane with acetic anhydride to stabilize same.

7. The polyoxymethylene produced by the process as claimed in claim 1 having a crystalline fibrous structure, a reduced viscosity of 3.5–5 as measured in aniline and a sulphite index of 0–2.

References Cited

UNITED STATES PATENTS

| 2,985,623 | 5/1961 | Schweitzer et al. | 260—67 |
| 2,998,409 | 8/1961 | Dal Nogare | 260—67 |
| 2,978,396 | 4/1961 | Shewmaker et al. | 204—154 |
| 3,242,063 | 3/1966 | Okamura et al. | 204—159.21 |

OTHER REFERENCES

Okamura et al., Radiation Induced Polymerization of Trioxane, Isotopes and Radiation, vol. 3, No. 5 (1960), pp. 416–417.

MURRAY TILLMAN, Primary Examiner

RICHARD B. TURER, Assistant Examiner

U.S. Cl. X.R.

260—67